US 7,089,381 B2

(12) United States Patent
Horn et al.

(10) Patent No.: US 7,089,381 B2
(45) Date of Patent: Aug. 8, 2006

(54) MULTIPLE STORAGE ELEMENT COMMAND QUEUES

(75) Inventors: Robert L. Horn, Yorba Linda, CA (US); Virgil V. Wilkins, Perris, CA (US)

(73) Assignee: Aristos Logic Corporation, Foothill Ranch, CA (US)

( * ) Notice: Subject to any disclaimer, the term of this patent is extended or adjusted under 35 U.S.C. 154(b) by 314 days.

(21) Appl. No.: 10/742,949

(22) Filed: Dec. 23, 2003

(65) Prior Publication Data

US 2005/0066138 A1 Mar. 24, 2005

Related U.S. Application Data

(60) Provisional application No. 60/505,056, filed on Sep. 24, 2003.

(51) Int. Cl.
*G06F 12/00* (2006.01)
(52) U.S. Cl. .................. 711/158; 711/151; 710/40; 710/240
(58) Field of Classification Search .......... 711/151, 711/158; 710/36, 40, 113–116, 240–244; 718/103
See application file for complete search history.

(56) References Cited

U.S. PATENT DOCUMENTS

| | | | |
|---|---|---|---|
| 6,000,001 A * | 12/1999 | Larson | 710/244 |
| 6,098,114 A | 8/2000 | McDonald et al. | |
| 6,134,630 A | 10/2000 | McDonald et al. | |
| 6,138,176 A | 10/2000 | McDonald et al. | |
| 6,154,800 A * | 11/2000 | Anand | 710/107 |
| 6,301,625 B1 | 10/2001 | McDonald et al. | |
| 6,421,760 B1 | 7/2002 | McDonald et al. | |
| 6,425,060 B1 * | 7/2002 | Mounes-Toussi et al. | 711/158 |
| 6,609,149 B1 | 8/2003 | Bandera et al. | |
| 6,816,947 B1 * | 11/2004 | Huffman | 711/151 |
| 6,895,482 B1 * | 5/2005 | Blackmon et al. | 711/158 |

* cited by examiner

*Primary Examiner*—Nasser Moazzami
(74) *Attorney, Agent, or Firm*—Dickstein Shapiro Morin & Oshinsky LLP

(57) ABSTRACT

A storage element pending command queue prioritization system using multiple pending queues each assigned to a particular RAID command type. Pending commands from each of the queues are organized in such a way that lower priority commands are guaranteed a fixed amount of storage element bandwidth. Storage element throughput is optimized by limiting higher priority commands to a maximum service level and processing lower priority requests with the added storage element bandwidth, allowing lower priority requests to exceed their minimum service levels.

14 Claims, 2 Drawing Sheets

MULTIPLE STORAGE ELEMENT COMMAND QUEUES

This application claims priority under 35 USC §119 to U.S. provisional patent application No. 60/505,056, filed Sep. 24, 2003, the entire contents of which is incorporated herein by reference.

FIELD OF THE INVENTION

The present invention relates to a networked storage system. In particular, this invention relates to the incorporation of multiple storage element command queues for greater efficiency, throughput, and performance in a networked storage system.

BACKGROUND OF THE INVENTION

In conventional networked storage systems, large volumes of data are repeatedly recorded and retrieved. Due to the magnitude of data, large numbers of storage elements are employed to archive the information and make it readily available when requested. The sheer number of storage elements necessitates using precise and complex controllers to manage not only where specific data is stored but also the storage and retrieval process. The controllers act as a management layer to oversee storage operations and to offload the processing-intensive storage functions from the system hosts. This offloading of storage tasks allows the hosts to use more processing cycles for other primary functions. In this manner, hosts write data to and access data contained on storage elements through storage controllers.

In conventional storage controller architectures, storage element access commands (typically, data reads and writes to a hard disk drive or like device) are sent to a command pending queue. These queued commands are sent to their respective storage elements in the order received. The storage controller may generate storage element access commands to service different tasks, including a misread cache, no cache write (e.g., FUA), copy, flush cache, etc. Some commands, for example, a cache misread command, require the host to wait for the results, while others, for example, a flush cache command, may be administered as a background task. The tasks may have several different levels of priority, and those priority levels, both relative and absolute, may change over time.

In the most basic implementation of a command pending queue, the first commands into the queue are the first to be processed, and so on. The pending queue is a single list of various types of commands and may include time-critical tasks, i.e., in which the host is waiting for a response, or non-time-critical tasks. However, there is no prioritization to optimize storage element access command processing in such a way that latency due to critical storage element-dependent tasks is minimized.

Simple prioritization schemes, such as placing all high-priority tasks like cache misreads at the head of a given storage element queue, are possible; however, this solution has an inherent problem. In a storage controller use modality in which there is a significant percentage of high-priority tasks, the lower priority tasks may not get adequate servicing. For example, although flush cache tasks may be non-critical to host data latency, they must be performed relatively frequently to ensure non-volatile storage of data and efficient cache management. What is needed is a way to manage pending commands that allows command prioritization and provides minimal service levels for all commands.

An example method for prioritizing storage element commands is described in U.S. Pat. No. 6,609,149, entitled, "Method and Apparatus for Prioritizing Video Frame Retrieval in a Shared Disk Cluster". The '149 patent describes how a first frame deadline is calculated and attached to an I/O request for prioritizing and retrieving video data frames from a shared disk cluster. Disk adapters queue video data frame requests according to the deadline incorporated in the frame requests. Data frames are transmitted to a requesting end user utilizing the attached deadline time to schedule the frames according to a time priority. A "slack" time is computed and utilized to determine when the first frame and subsequent frames of the requested video data may be retrieved from disk and present in the video server's memory in order to avoid a visible delay in sending that frame to the end user. Slack time is saved to each disk read request command packet and is equal to deadline time less the current time at which the command packet is sent to the disk adapter. The process next issues the disk read request to the disk adapter. The process continues to queue read commands in the disk adapter. While in the disk adapter queue, slack time of each read command is regularly decremented so that the waiting time of the read command in queue is reflected. The disk controller requests another command and the disk adapter sends a read command having the least slack time remaining.

Although the method described in the '149 patent provides a method of guaranteeing a minimum I/O bandwidth for each disk drive, it is specific to disk read commands (for a video on demand system) and does not provide an operational method for prioritizing other storage element commands such as write, rebuild, or copy, for example. The disk adapter described in the '149 patent prioritizes read commands based on latency requirements and sends read commands to the storage element in that order. The method described in the '149 patent does not teach one skilled in the art how to prioritize other types of system commands, conventionally used in a networked storage element array, without compromising storage element bandwidth for any commands. There is therefore, a need to provide higher and lower prioritization levels for various storage element commands and ensure that all priority level commands are processed with minimal latency.

SUMMARY OF THE INVENTION

Therefore, it is an object of the present invention to minimize latency to higher priority queues while maintaining minimum service throughput requirements on lower priority queues.

It is another object of the present invention to provide a method of guaranteeing minimal service levels for all pending storage access commands in a storage controller.

It is another object of the present invention to provide a method of managing pending storage access commands that allows command prioritization for any type of command in a storage controller.

The present invention achieves the foregoing objectives by providing a system and method of managing pending storage access commands in a storage element command queue that provides for command prioritization. The method enables a guaranteed minimal service level for all pending commands in a queue. The minimal service level is defined according to system requirements and may be optimized and reconfigured as service level needs change. Furthermore, the present invention maintains the sequence of commands in their respective task type queues such that sequential commands are processed in the correct order.

BRIEF DESCRIPTION OF THE DRAWINGS

These and other features and advantages of the present invention will become apparent when the following description is read in conjunction with the accompanying drawings, in which.

DETAILED DESCRIPTION OF THE INVENTION

Figure 1:
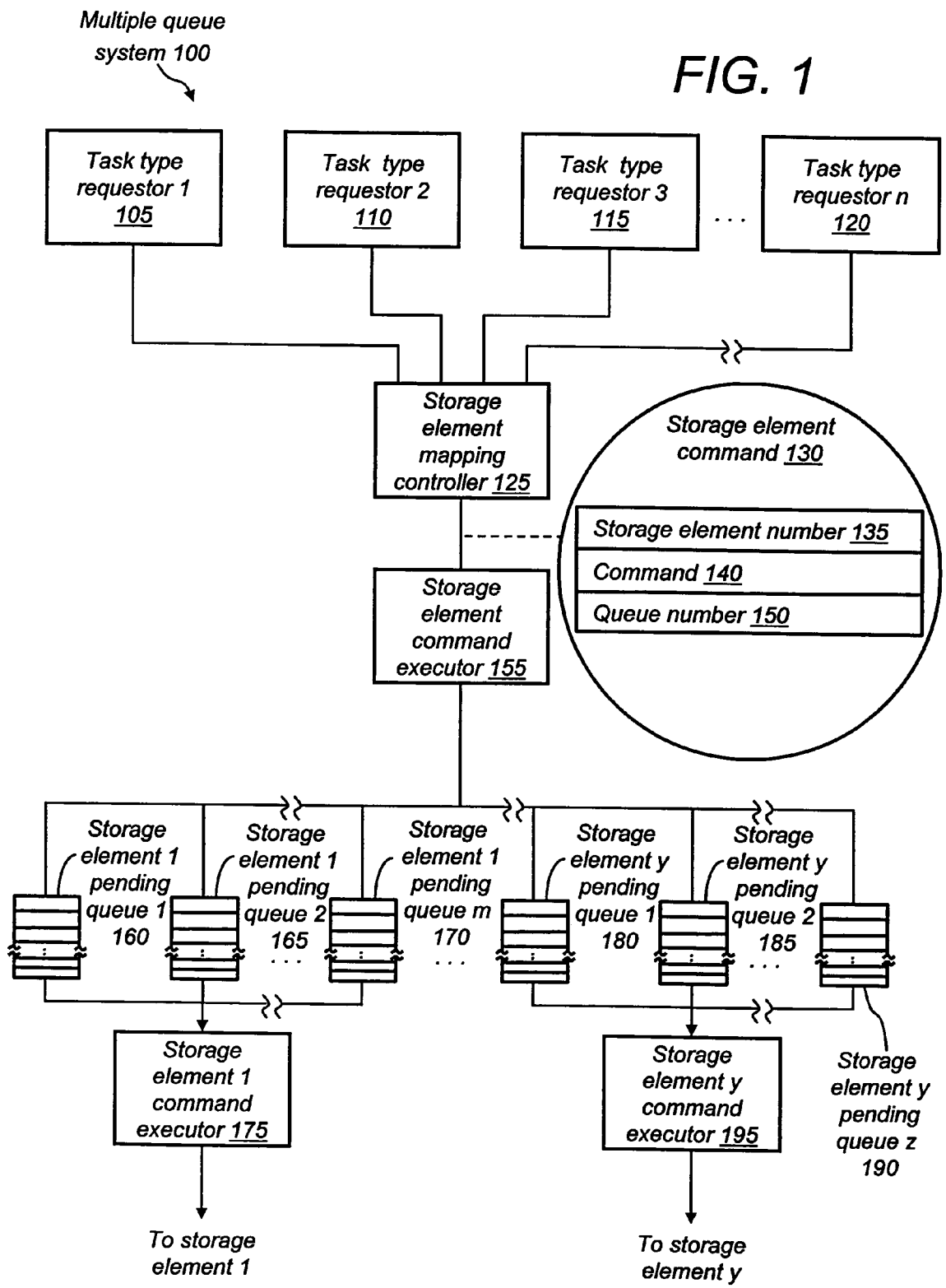
FIG. 1 is a diagram of a multiple queue system for prioritization.

FIG. 1 is a block diagram of a multiple queue system 100 that includes a task type requestor 1 105, a task type requestor 2 110, a task type requestor 3 115, and a task type requestor n 120 (in general, "n" is used herein to indicate an indefinite plurality, so that the number "n" when referred to one component does not necessarily equal the number "n" of a different component). Task type requestor 1 105 is a functional block that is responsible for requesting one specific type of task that results in a storage element access command. Task type requestor 1 105 generates specific typed task requests in response to controller top-level storage element service requests. These requests may be either internal (e.g., cache management) or external (e.g., host request processing) storage element service requests, such as a flush cache command, a cache misread command, a no-cache write command, a copy command, a rebuild command, etc. The same is true for task type requestor 2 110, task type requestor 3 115, and task type requestor n 120.

Requests are received by a storage element mapping controller 125, which in turn creates a storage element command 130. Storage element command 130 includes a storage element number 135, a command 140, and a queue number 150. Queue number 150 denotes a priority level for command 140. An external authority determines the priority level. Storage element number 135 corresponds to the appropriate storage element for command 140. Command 140 may be all or part of the original task from the host processor or an internally generated task.

A top-level storage element command executor 155 is coupled to a storage element 1 pending queue 1 160, a storage element 1 pending queue 2 165, and a storage element 1 pending queue m 170 ("m" is used herein to indicate an indefinite plurality, so that the number "m" when referred to one component does not necessarily equal the number "m" of a different component). Top-level storage element command executor 155 routes storage element command 130 into its respective pending queue based on storage element number 135 and queue number 150. For example, if storage element number 135 were equal to the value of '1' and queue number 150 equaled the value '2', then command 140 would be placed into storage element 1 pending queue 2 165 for processing. For the purposes of this example, storage element 1 pending queue 1 160 has a higher priority over storage element 1 pending queue 2 165, and so forth for all pending queues for storage element 1 (not shown). However, any priority scheme may be implemented to provide system optimization.

A storage element 1 command executor 175 is coupled to storage element 1 pending queue 1 160, storage element 1 pending queue 2 165, and storage element 1 pending queue m 170. Storage element 1 command executor 175 is responsible for feeding storage element 1 a list of commands taken from the oldest commands residing in storage element 1 pending queue 1 160, storage element 1 pending queue 2 165, and storage element 1 pending queue m 170 according to an algorithm discussed in reference to FIG. 2. Storage element 1 command executor 175 provides a series of commands to storage element 1 until storage element 1 has no capacity to accept new commands. At that time, storage element 1 command executor 175 waits until storage element 1 has processed some of its commands and has the capacity to accept a new command.

Likewise, a storage element y pending queue 1 180 ("y" is used herein to indicate an indefinite plurality, so that the number "y" when referred to one component does not necessarily equal the number "y" of a different component), a storage element y pending queue 2 185, and a storage element y pending queue z 190 ("z" is used herein to indicate an indefinite plurality, so that the number "z" when referred to one component does not necessarily equal the number "z" of a different component) are coupled to a storage element y command executor 195 for controlling the flow of commands to be processed by storage element y (not shown). Therefore, for each storage element in multiple queue system 100, there corresponds a plurality of prioritized pending queues coupled to a storage element command executor.

In this manner, all commands, regardless of priority, are guaranteed a certain amount of bandwidth from their respective storage element. Furthermore, more commands from lower priority queues are processed as fewer tasks arrive in the higher priority queues and more storage element processing bandwidth becomes available.

TABLE 1

Storage element configuration

| Queue number | Minimum service level | Maximum service level | No. of active commands in queue |
|---|---|---|---|
| 1 | $Min_1$ | $Max_1$ | $A_1$ |
| 2 | $Min_2$ | $Max_2$ | $A_2$ |
| . | . | . | . |
| . | . | . | . |
| . | . | . | . |
| m | $Min_m$ | $Max_m$ | $A_m$ |

Storage element total Active commands: $\sum_{i=1}^{m} A_i$

Table 1 is a storage element priority configuration table. The storage element priority configuration table is developed by an external authority to establish queue priority. In this example, queue 1 has the highest priority while queue m has the lowest priority.

Each queue has a minimum required service level and a maximum service level. These service levels are the number of times the queue is serviced over a given measured interval. For example, if $min_1=50\%$, then storage element 1 must service queue 1 commands at least 50% of the time; in other words, 50% of the commands that storage element 1 processes must be queue 1 commands. An external authority dictates the minimum service levels for each queue.

Maximum service level is also set by an administrative authority and represents the maximum processing time or service level allotted to that specific queue. For example, if $max_2$ is 75%, then storage element 1 must not process queue 2 commands any more than 75% of the time; in other words, no more than 75% of the commands processed by storage element may be queue 2 commands.

The number of active commands in a queue is the total number of commands held within a particular queue. The sum of each of the queues' active commands is the total number of pending commands for a particular storage element.

Figure 2:
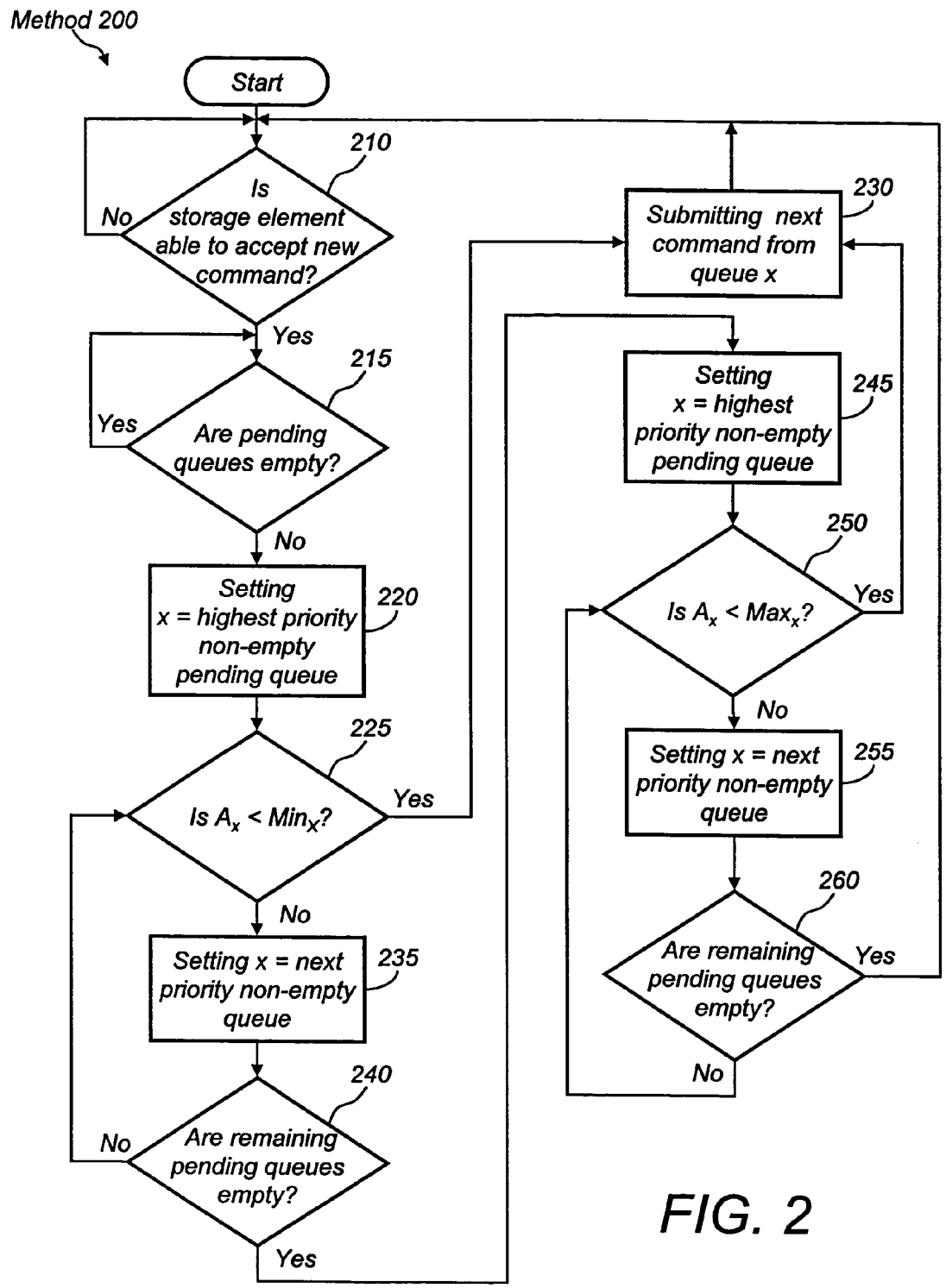
FIG. 2 is a flow diagram of a storage element executor submit method.

FIG. 2 is a flow diagram of a storage element executor method 200 using storage element 1 command executor 175 as an example. However, method 200 may be used for any storage element. That is, FIG. 2 is a method of retrieving stored storage element commands from pending queues in which they have been stored based on priority and specific-type tasks.

Step 210: Is storage element able to accept new command?

In this decision step, storage element 1 command executor 175 checks the processing command queue of storage element 1 (not shown) to determine whether there is capacity to assign a new command to the queue. If yes, method 200 proceeds to step 215; if no, method 200 returns to step 210.

Step 215: Are pending queues empty?

In this decision step, storage element 1 command executor 175 assesses whether all of the pending command queues are empty. If yes, method 200 returns to step 215; if no, method 200 proceeds to step 220.

Step 220: Setting x=highest priority non-empty pending queue

In this step, storage element 1 command executor 175 looks at each of the pending queues from highest priority to lowest priority to find the first non-empty queue, i.e., a queue containing pending commands. Storage element 1 command executor 175 assigns the number of that queue to x. Method 200 proceeds to step 225.

Step 225: Is $A_x < Min_x$?

In this decision step, storage element 1 command executor 175 accesses storage element 1's priority configuration table to determine whether the total number of active commands for queue x is less than the minimum service level requirement for queue x. If yes, method 200 proceeds to step 230; if no, method 200 proceeds to step 235.

Step 230: Submitting next command from queue x

In this step, storage element 1 command executor 175 places the oldest command from queue x onto the tail of the pending queue for the storage element. Method 200 returns to step 210.

Step 235: Setting x=next priority non-empty queue

In this step, storage element 1 command executor 175 checks the number of pending commands in the next priority queue to find the next queue from which to process a command. The next priority non-empty queue number is given to x. Method 200 proceeds to step 240.

Step 240: Are remaining pending queues empty?

In this decision step, storage element 1 command executor 175 determines whether there are no queues with any pending commands, i.e., whether all pending queues are empty. If yes, method 200 proceeds to step 245; if no, method 200 returns to step 225.

Step 245: Setting x=highest priority non-empty pending queue

In this step, storage element 1 command executor 175 looks at each of the pending queues from highest priority to lowest priority to find the first non-empty queue, i.e., a queue containing pending commands. Storage element 1 command executor 175 assigns the value of that queue to x. Method 200 proceeds to step 250.

Step 250: Is $A_x < Max_x$?

In this decision step, storage element 1 command executor 175 looks at storage element 1's priority configuration table to determine whether the current command count in queue x is less than the maximum service level assigned to queue x. If yes, method 200 returns to step 230; if no, method 200 proceeds to step 255.

Step 255: Setting x=next priority non-empty queue

In this step, storage element 1 command executor 175 checks the number of pending commands in the next priority queue to find the next queue from which to process a command. The next priority non-empty queue number is assigned to x. Method 200 proceeds to step 260.

Step 260: Are remaining pending queues empty?

In this step, storage element 1 command executor 175 determines whether all of the remaining priority queues are empty. If yes, method 200 returns to step 210; if no, method 200 returns to step 250.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

The invention claimed is:

1. A method for optimizing latency and performance of storage elements in a storage system that executes different priority tasks while providing a minimal level of throughput, comprising the steps of:
   distinguishing between storage element commands by task type; and
   issuing storage element commands based on priority and throughput requirements per task type, independent of the order that said storage element commands are received,
   wherein said priority and throughput requirements specify a minimum and maximum processing time allotted for each task type.

2. A method of optimizing latency and performance of storage elements in a storage system that executes different priority tasks while providing a minimal level of throughput, comprising the steps of:
   establishing separate queues of storage element commands for each task type;
   assigning a priority to each of said queues;
   in order of highest-to-lowest priority queues, retrieving and executing a plurality of storage element commands from each of said queues such that a minimum processing time requirement for each queue is met; and
   in order of highest-to-lowest priority queues, retrieving and executing additional storage element commands from each of said queues until a maximum processing time requirement for higher priority queues is met.

3. The method of claim 2, wherein said task type comprises any of read miss, flush and rebuild tasks.

4. The method of claim 2, wherein said assigned priority is maintained in a storage element priority configuration table.

5. A method of operating a storage system to optimize latency and performance of storage elements, comprising the steps of:
   receiving a storage element service request;
   generating a task-type specific request; and issuing a storage element command to a storage element based on priority per task-type, independent of the order in which the storage element service request was received relative to other storage element service requests, wherein the storage element command is issued in accordance with a minimum and maximum processing time allotted for each task type.

6. A method of operating a storage system, comprising the steps of:

receiving a storage element service request by one of a plurality of task-type requestors;

generating a task-type specific request by said one of said plurality of task-type requestors;

creating a storage element command;

routing said storage element command to one of a plurality of pending queues; and forwarding said storage element command to a storage element in accordance with a minimum and maximum processing time requirement for each of said plurality of pending queues.

7. The method according to claim 6, wherein said pending queue to which the storage element command is route is based on task-type and priority.

8. The method according to claim 7, further comprising executing said storage element commands by said storage element.

9. A method of operating a storage system, comprising the steps of:

determining if a storage element is able to accept a storage element command;

accessing one of said plurality of pending queues based on a priority, if said storage element is able to accept said storage element command;

determining if said storage element command stored in said accessed pending queue satisfies a service level requirement; and retrieving said storage element command from said accessed pending queue if said service level requirement is satisfied, wherein said service level requirement includes a minimum and maximum processing time requirement for each of said plurality of pending queues.

10. The method according to claim 9, further comprising the step of forwarding said retrieved storage element command to said storage element for execution.

11. A method of operating a storage system, comprising the steps of:

(a) verifying that a storage element is able to accept a storage element command;

(b) verifying that there is a non-empty pending queue from which to retrieve said storage element command;

(c) accessing a highest priority non-empty pending queue;

(d) determining if the number of active commands for said highest priority non-empty pending queue is less than a minimum required service level for that queue;

(e) if said minimum required service level for said highest priority non-empty pending queue has not been met, retrieving said storage element command from said highest priority non-empty pending queue, and returning to step (a) to repeat the process;

(f) if said minimum required service level for said highest priority non-empty pending queue has been met, determining if any remaining pending queues are empty;

(g) if not all remaining pending queues are empty, accessing the next highest priority non-empty pending queue, and repeating the process beginning in step (d) with the next highest priority non-empty queue;

(h) if all remaining pending queues are empty, determining if the number of active commands for the highest priority non-empty pending queue is less than a maximum service level;

(i) if said maximum required service level for said highest priority non-empty pending queue has not been met, retrieving said storage element command from said highest priority non-empty pending queue, and returning to step (a) to repeat the process;

(j) if said maximum required service level for said highest priority non-empty pending queue has been met, determining if any remaining pending queues are empty;

(g) if not all remaining pending queues are empty, accessing the next highest priority non-empty pending queue, and repeating the maximum service level determining process in step (h) with the next highest priority non-empty queue;

(h) if all remaining pending queues are empty, returning to step (a) to repeat the process until all pending storage element commands have been executed.

12. A method of operating a storage system, said method comprising:

establishing a plurality of pending queues for storage element commands for each specific type of task;

establishing a priority level for each said plurality of pending queues;

loading each of said plurality of pending queues with storage element commands based on the specific type of task and the priority of said storage element command; and selecting one of said storage element commands from one of said plurality of pending queues based on priority and satisfaction of service level requirements, wherein said service level requirements include a minimum and maximum processing time requirement for each of said plurality of pending queues.

13. A method of populating pending queues, comprising the steps of:

establishing a plurality of pending queues for storage element commands for each specific type of task;

establishing a priority level for each said plurality of pending queues;

establishing a minimum and maximum processing time requirement for each of said plurality of pending queues;

receiving a storage element service request;

generating a type specific task request;

creating a storage element command;

routing said storage element command into a respective pending queue based on the task type and priority.

14. A method of operating a storage system, said method comprising:

establishing a plurality of pending queues of storage element commands based on task type;

establishing a plurality of priorities for each said pending queue;

populating each said pending queue with storage element commands according to the task type of each of said storage element commands; and issuing said storage element commands to a drive controller for execution based on priority and service level requirements, wherein said service level requirements include a minimum and maximum processing time for each said pending queue.

* * * * *